US012633852B2

(12) United States Patent
Shin et al.

(10) Patent No.: US 12,633,852 B2
(45) Date of Patent: May 19, 2026

(54) METHOD AND APPARATUS FOR DETECTING SENSING DELAY OF SENSOR EQUIPPED IN ELECTRIC MOTER

(71) Applicant: HL MANDO CORPORATION, Gyeonggi-do (KR)

(72) Inventors: Hyeung Shin, Gyeonggi-do (KR); Jaesang Park, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 171 days.

(21) Appl. No.: 18/385,389

(22) Filed: Oct. 31, 2023

(65) Prior Publication Data

US 2024/0421734 A1 Dec. 19, 2024

(30) Foreign Application Priority Data

Jun. 13, 2023 (KR) ........................ 10-2023-0075267

(51) Int. Cl.
*H02P 1/46* (2006.01)
*H02P 21/06* (2016.01)
*H02P 21/22* (2016.01)
*H02P 27/06* (2006.01)

(52) U.S. Cl.
CPC .............. *H02P 21/06* (2013.01); *H02P 21/22* (2016.02); *H02P 27/06* (2013.01)

(58) Field of Classification Search
CPC .......... H02P 21/06; H02P 21/20; H02P 21/22; H02P 6/10; H02P 21/05; H02P 2205/05; H02P 29/032
See application file for complete search history.

(56) References Cited

U.S. PATENT DOCUMENTS 7,885,785 B1 * 2/2011 Pekarek .................... H02P 6/20
702/145
2014/0375234 A1 * 12/2014 Kim .......................... H02P 6/08
318/400.15

FOREIGN PATENT DOCUMENTS

JP WO2014080456 A1 * 1/2017 .............. H02P 27/04
KR 10-2013-0080701 7/2013
KR 10-2015-0000364 1/2015
KR 10-2023-0022821 2/2023

OTHER PUBLICATIONS

Office Action dated Jun. 2, 2025 for Korean Patent Application No. 10-2023-0075267 and its English translation by Google Translate/ provided by Applicant's foreign counsel.

* cited by examiner

*Primary Examiner* — Karen Masih
(74) *Attorney, Agent, or Firm* — WOMBLE BOND DICKINSON (US) LLP

(57) ABSTRACT

Disclosed is an apparatus for detecting a sensing delay of a sensor provided in an electric motor, the apparatus including: a shaft configured to be axially coupled with the electric motor; a load machine axially coupled with the shaft; a controller configured to control a rotational speed of the load machine; a torque sensor connected to the load machine and configured to measure a torque; and a detector configured to detect a sensing delay of the sensor based on a torque value obtained using the torque sensor.

19 Claims, 6 Drawing Sheets

140: Angle Sensor
240: Torque Sensor
245: Coupler

140: Angle Sensor

140: Angle Sensor
240: Torque Sensor
245: Coupler

METHOD AND APPARATUS FOR DETECTING SENSING DELAY OF SENSOR EQUIPPED IN ELECTRIC MOTER

CROSS-REFERENCE TO RELATED APPLICATION

This application claims priority under 35 U.S.C. § 119 to Korean Patent Application No. 10-2023-0075267, filed on Jun. 13, 2023, in the Korean Intellectual Property Office (KIPO), the disclosure of which is incorporated by reference herein in its entirety.

TECHNICAL FIELD

The present disclosure relates to a method and an apparatus for detecting a sensing delay and, more particularly, to a method and an apparatus for detecting a sensing delay of a current sensor and/or an angle sensor provided in an electric motor.

BACKGROUND

The electric motor is an electrical machine device that converts electrical energy into rotational energy, and a drive controller is commonly used to operate the electric motor. FIG. 1, there is a permanent magnet synchronous motor (PMSM) driven by three-phase current as an example. Referring to FIG. 1, a drive controller 110 controls the operation of a permanent magnet synchronous motor (PMSM) 130 by transmitting current control signals $S_a$, $S_b$, and $S_c$ for phases (phase a, phase b, and phase c) to an inverter 120. In this case, the drive controller 110 receives feedback from the angle sensor 140 provided in the PMSM 130, which measures an angle θ, and from the current sensors 150 and 155 provided in the inverter 120, which measure a current value $i_a$, $i_b$, or $i_c$. Under ideal conditions, the current and angle values are measured simultaneously and fed into the drive controller 110. However, in reality, there is a delay due to the sensing processing time of each sensor 140, 150, or 155. This delay results in the occurrence of undesired torque or torque ripple in the PMSM 130, causing adverse effects on the system.

The delay caused by the sensors is not detected even during monitoring while the electric motor is actually controlled. Therefore, the drive controller receives feedback with delayed measurement values and perceives as successfully following the current control. As a result, it is challenging to confirm whether any issue has occurred. Therefore, there is a need for a solution to detect a sensing delay that occurs during a sensing processing and/or data transmission of a sensor provided in an electric motor.

SUMMARY

The present disclosure provides a method and an apparatus for detecting a sensing delay of a sensor provided in an electric motor.

The present disclosure also provide a method and an apparatus for detecting a counter-torque that can cause stalling and vibration in a high-speed region in a system using an electric motor.

Technical objects to be achieved by the present disclosure are not limited to those described above, and other technical objects not mentioned above may also be clearly understood from the descriptions given below by those skilled in the art to which the present disclosure belongs.

In one aspect of the present disclosure, there is provided an apparatus for detecting a sensing delay of a sensor provided in an electric motor, the apparatus including: a shaft configured to be axially coupled with the electric motor; a load machine axially coupled with the shaft; a controller configured to control a rotational speed of the load machine; a torque sensor connected to the load machine and configured to measure a torque; and a detector configured to detect a sensing delay of the sensor based on a torque value obtained using the torque sensor.

The apparatus may further include a coupler provided in the shaft and coupling the electric motor and the load machine with each other.

The detector may determine whether the torque value is greater than or equal to a threshold value based on that 0 Nm torque control is performed on the electric motor and a rotational speed control is performed on the load machine.

The controller may be further configured to control the load machine so that the rotational speed increases linearly from 0 rpm to a maximum speed.

The torque value may be a value of difference between a measurement value measured by the torque sensor and a friction torque.

The controller may be configured to control stopping of rotation of the load machine based on that the torque value is greater than or equal to the threshold value.

The detector may be further configured to re-determine whether the torque value is greater than or equal to the threshold value in a state where a maximum current control is performed on the electric motor and a rotational speed control is performed on the load machine based on that the torque value is greater than or equal to the threshold value.

The detector may, according to a result of the re-determination, determine that a sensing delay has occurred in the sensor based on that the torque value is greater than or equal to the threshold value.

In another aspect of the present disclosure, there is provided a method for detecting a sensing delay of a sensor provided in an electric motor by an apparatus for detecting a sensing delay, the method including: controlling a rotational speed of a load machine coupled with the electric motor based on that a drive control is performed on the electric motor; measuring a torque using a torque sensor provided in the load machine; and detecting a sensing delay of the sensor based on a measurement value received from the torque sensor.

In yet another aspect of the present disclosure, there is provided a computer program stored on a computer-readable recording medium, wherein the computer program comprises instructions that, when executed by a processor, perform operations including: controlling a rotational speed of a load machine coupled with an electric motor based on that a drive control is performed on the electric motor; receiving a measurement value from a torque sensor provided in the load machine; and detecting a sensing delay of a sensor provided in the electric motor based on the measurement value received from the torque sensor.

According to an embodiment of the present disclosure, since a sensing delay occurring by sensors provided in an electric motor can be detected by measuring a torque according to a rotational speed of a load machine in a state where a torque control and a current control are performed on the electric motor, it is possible to prevent an undesired torque in the electric motor.

According to an embodiment of the present disclosure, since a reverse torque generated by the electric motor can be detected, it is possible to drive the electric motor with optimal performance according to the electric motor's specifications.

DETAILED DESCRIPTION

Figure 1:
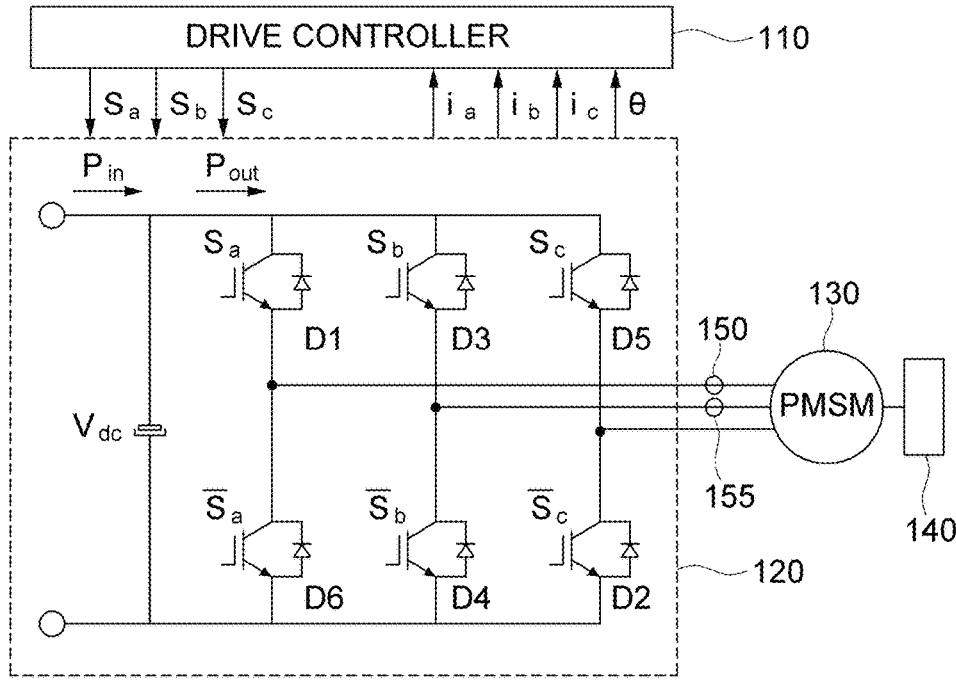
FIG. 1 is a view showing a permanent magnet type synchronous motor.

The advantages and features of the present disclosure, and a method for achieving them will be clearly understood with reference to the embodiments described in detail together with appended drawings. However, the present disclosure is not limited to the embodiments disclosed below but may be implemented in various other forms; rather, the present embodiments are provided to make the present disclosure complete and inform those skilled in the art clearly of the technical scope of the present disclosure, and the present disclosure may be defined within the technical scope of the appended claims. Thus, in some embodiments, well-known processing steps, structures, and techniques have not been described in detail to avoid obscuring the interpretation of the present disclosure.

The terms used in the present disclosure have been selected from commonly used and widely accepted terms that best describe the functions of the present disclosure; however, it should be noted that the selection of terms may vary depending on the intention of those persons skilled in the corresponding field, precedents, or emergence of new technologies. Also, in a particular case, some terms may be selected arbitrarily by the applicant, and in this case, detailed definitions of the terms will be provided in the corresponding description of the present disclosure. Therefore, the terms used in the present disclosure should be defined not simply by their apparent name but based on their meaning and context throughout the present disclosure.

Throughout the document, unless otherwise explicitly stated, if a particular element is said to "include" some particular element, it means that the former may further include other particular elements rather than exclude them.

Also, the term "unit" or "module" used in the present disclosure may refer to a software component or a hardware component such as a Field Programmable Gate Array (FPGA) or an Application Specific Integrated Circuit (ASIC), and the "unit" or "module" performs at least one function or operation. However, the "unit" or "module" is not necessarily limited to a software or hardware component. The "unit" or "module" may be configured to be implemented in an addressable storage medium or configured to operate one or more processors. Therefore, for example, the "unit" or "module" includes those components such as software components, object-oriented software components, class components, and task components; processes, functions, properties, procedures, subroutines, segments of a program code, drivers, firmware, micro-code, circuits, data, databases, data structures, tables, arrays, and variables. The functions provided by the constituting elements and the "unit" or "module" of the present disclosure may be combined into a smaller number of constituting elements, "units", and "modules" or further divided into additional constituting elements, "units", or "modules".

Also, the terms such as first, second, and third are introduced to describe various constituting elements, but the constituting elements should not be limited by the terms. The terms are used only for the purpose of distinguishing one from the other constituting elements.

In what follows, embodiments of the present disclosure will be described in detail with reference to appended drawings so that those skilled in the art to which the present disclosure belongs may readily apply the present disclosure. Moreover, to describe the present disclosure without ambiguity, those parts not related to the description of the present disclosure have been omitted. Throughout the document, same reference symbols refer to the same constituting elements.

Figure 2:
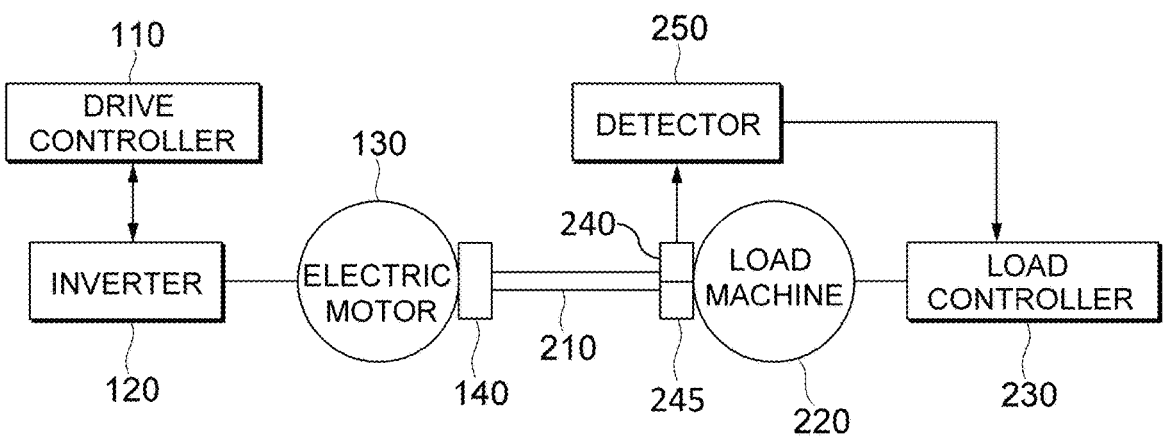
FIG. 2 is a diagram illustrating an apparatus for detecting a sensing delay according to an embodiment of the present disclosure.

FIG. 2 is a diagram illustrating an apparatus for detecting a sensing delay according to an embodiment of the present disclosure.

Referring to FIG. 2, an apparatus for detecting a delay in sensing by a sensor of an electric motor according to an embodiment of the present disclosure may include: a shaft 210 axially coupled with an electric motor 130; a load machine 220 axially coupled with the shaft 210; a load controller 230 configured to control a rotational speed of the load machine 220; a torque sensor 240 connected to the load machine 220 to measure a torque; and a detector 250 configured to detect a time delay or sensing delay occurring during a sensing and/or data transmission process of a sensor provided in the electric motor 130 based on a torque value obtained using the torque sensor 240.

The electric motor 130 may be driven based on power supplied from an inverter 120, and the inverter 120 may convert DC power into AC power and supply the AC power to the electric motor 130 based on a current control signal from the drive controller 110.

In this embodiment, the drive controller 110 may be configured as a digital signal processor (DSP) controller, and the inverter 120 may be configured to operate based on a three-phase current. The electric motor 130 may be composed of a permanent magnet synchronous motor (PMSM). Hereinafter, a case in which an apparatus for detecting a sensing delay is installed in a vehicle and detects a sensing delay by a sensor included in a permanent magnet synchronous motor driven based on a three-phase current will be described.

At least two current sensors (not shown) may be provided in the inverter 120 to measure a current supplied from the inverter 120 to the electric motor 130, and an angle sensor 140 or a position sensor may be provided on one side of the electric motor 130 to measure an angle or position of a rotor provided in the electric motor 130. Here, the at least two current sensors may include a first current sensor for measuring a-phase current and a second current sensor for measuring b-phase current. The first current sensor and the second current sensor may be configured to measure a-phase current and c-phase current, respectively, or may be configured to measure b-phase current and c-phase current, respectively.

Based on current values received from two current sensors, the drive controller 110 may derive a current value for the other one phase. The drive controller 110 may generate current control signals for the respective phases based on feedback signals received from the current sensors provided in the inverter 120 and the angle sensor 140 provided in the electric motor 130. The drive controller 110 may control the on/off states of switches within the inverter 120 based on the current control signals to control a torque generated by the electric motor 130, thereby regulating a current supplied to the electric motor 130.

The shaft 210 may be configured in a cylindrical or cylindrical shape to be coupled with rotational shafts of the electric motor 130 and the load machine 220, and may transmit a torque generated from the electric motor 130 to the load machine 220. To this end, the shaft 210 may include a coupler 245 for coupling with the electric motor 130 and the load machine 220.

The load machine 220 may be a device that provides or supplies a load to the electric motor 130 and may be configured to rotate by a torque transmitted from the electric motor 130 through the shaft 210. A rotational speed of the load machine 220 may be controlled by the load controller 230 connected to the load machine 220.

In a case where the load controller 230 checks whether a sensing delay has occurred by the current sensor provided in the inverter 120 and the angle sensor provided in the electric motor 130, the load controller 230 may control the load machine 220 to linearly increase a rotational speed of the load machine 220 from 0 Rotations Per Minute (RPM) to a maximum speed.

The torque sensor 240 may be provided on one side of the load machine 220 to measure a torque generated from the electric motor 130 and the load machine 220.

The detector 250 may compare a torque value obtained using the torque sensor 240 with a preset threshold value to detect a sensing delay occurring by a sensor (current sensor and/or angle sensor) provided in the inverter 120 and the electric motor 130. For example, in a state where 0 Nm torque control is performed on the electric motor 130 and a rotational speed control is performed on the load machine 220, the detector 250 may determine whether a torque value obtained based on the torque sensor 240 is above the aforementioned threshold value. Alternatively, in a state where a maximum current control is performed on the d-axis current (Id) of the electric motor 130 and a rotational speed control is performed on the load machine 220, the detector 250 may determine whether a torque value obtained based on the torque sensor 240 is above the aforementioned threshold value. Here, the torque value may be a value of difference between a measurement value measured by the torque sensor 240 and a friction torque. When the torque value is greater than or equal to the threshold value, the load controller 230 may control the load machine 220 to stop rotation. Alternatively, when the torque value is greater than or equal to the threshold value, the detector 250 may control the load controller 230 to stop rotation of the load machine 220.

Meanwhile, in a state where 0 Nm torque control is performed on the electric motor 130 and the rotational speed of the load machine 220 is controlled to increase linearly from 0 RPM to a maximum speed, when a torque value obtained using the torque sensor 240 is greater than or equal to a threshold value, the detector 250 re-measures a torque value using the torque sensor 240 in a state where Id maximum current control is performed on the electric motor 130 and a rotational speed of the load machine 220 is controlled to increase linearly from 0 RPM to a maximum speed, and re-determines whether the re-measured torque value is greater than or equal to the threshold value. When the re-measured torque value is greater than or equal to the threshold value according to a result of the determination, the detector 250 may determine that a sensing delay has occurred in a sensor provided in the electric motor and/or the inverter.

Figure 3:
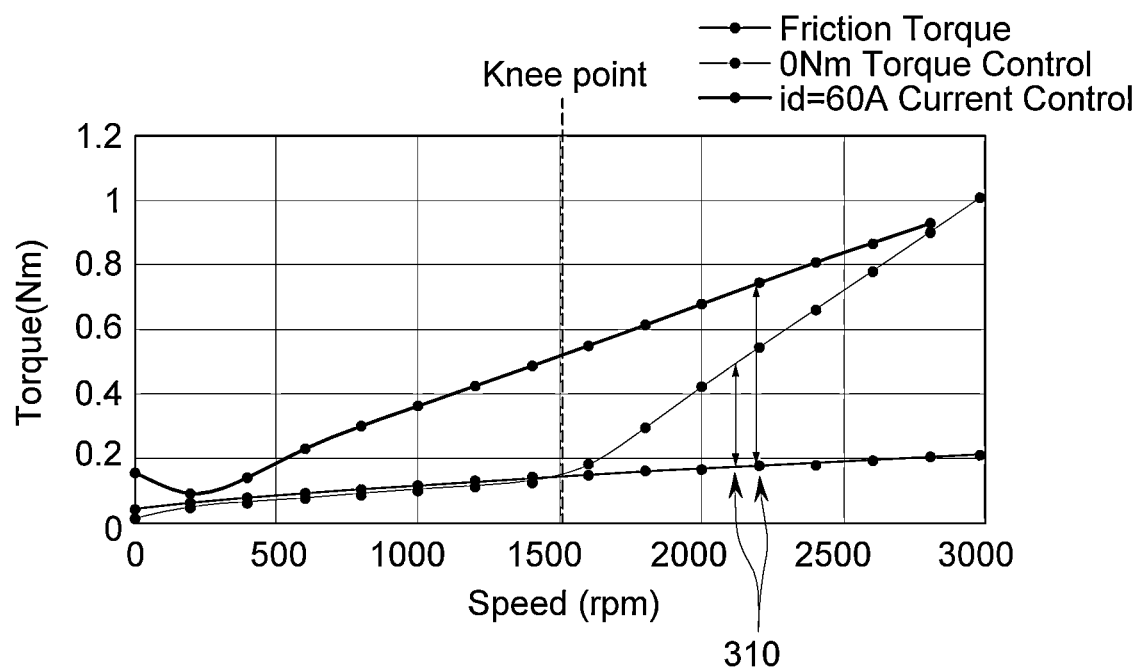
FIG. 3 is a graph showing a change in torque generated in an electric motor according to a rotational speed of a load.

FIG. 3 is a graph showing a change in torque generated in an electric motor according to a rotational speed of a load.

In FIG. 3, a variation of torque generated by the electric motor is illustrated in a situation where a rotational speed of the load machine is controlled to increase linearly over time. In a case where sensing delays occurs in sensors (a current sensor and an angle sensor) provided in the electric motor and the inverter, when a torque is actually measured using a torque sensor, as shown in FIG. 3, it may be observed that an undesired torque 310 other than the friction torque occurs. However, when a control variable is monitored on the inverter side during actual 0 Nm torque control, it seems that there is no problem in controlling the inverter because it follows the 0 Nm torque well. It may be observed that an undesired torque occurs even when Id maximum current (e.g., 60A) control is performed. Therefore, when the undesired torque 310 is generated as the rotational speed of the load increases during 0 Nm torque control and when the undesired torque 310 is generated as the rotational speed of the load increases during Id maximum current control, it may be determined that a sensing delay has occurred in sensors provided in the electric motor and the inverter. In this case, the sensing delay may be compensated for by matching the sensing delay and/or data transmission delay of the current sensor with that of the position sensor.

Figure 4:
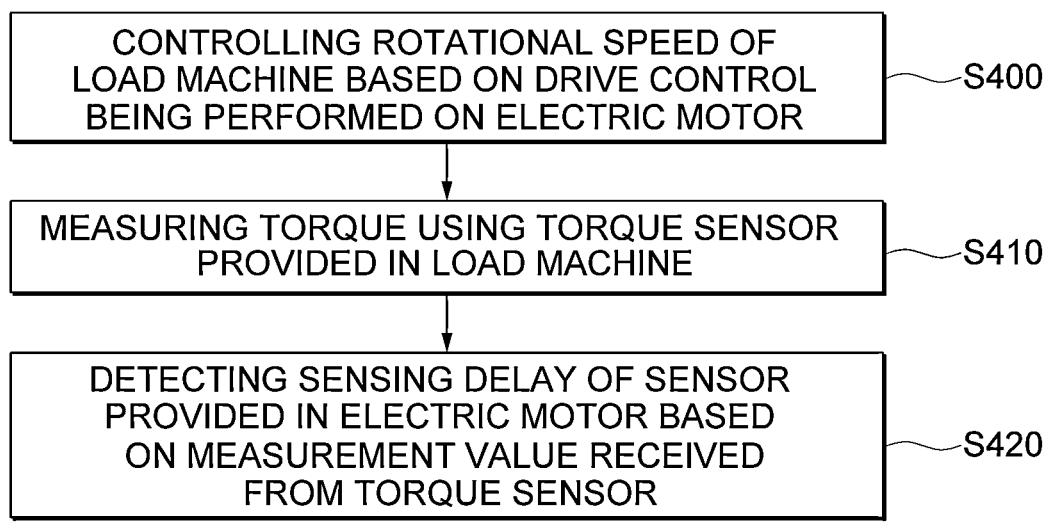
FIG. 4 is a diagram illustrating a method for detecting a sensing delay according to an embodiment of the present disclosure.

FIG. 4 is a diagram illustrating a method for detecting a sensing delay according to an embodiment of the present disclosure.

Referring to FIG. 4, a method for detecting a sensing delay of a sensor provided in an electric motor by an apparatus for detecting a sensing delay according to an embodiment of the present disclosure will be described.

Referring to FIG. 4, the apparatus for detecting a sensing delay may control a rotational speed of a load machine coupled with an electric motor based on drive control of the electric motor in operation S400. For example, the apparatus may control a rotational speed of a load machine connected to the electric motor to linearly increase from 0 rpm to a maximum speed in a state where 0 Nm torque control is performed by the drive controller of the electric motor. Alternatively, the apparatus may control the rotational speed of the load machine to linearly increase from 0 rpm to the maximum speed in a state where the drive controller performs a maximum current control on the d-axis current. In this case, the apparatus may measure a torque generated from the electric motor and/or the load machine using a torque sensor provided in the load machine in operation S410. Also, the apparatus may detect a sensing delay of a sensor included in the electric motor based on a measurement value received from the torque sensor in operation S420.

For example, the apparatus may calculate a difference between the measurement value received from the torque sensor and a friction torque, and compare the difference between the measurement value and the friction torque to a threshold value (e.g., 0.05 Nm). If the difference between the measurement value and the friction torque is less than the threshold value, the apparatus may determine that a sensor provided in the electric motor is in a normal state. That is, when the difference between the measurement value of the torque sensor and the friction torque is less than the threshold value, the apparatus may determine that there is no sensing delay. However, when the difference between the measurement value and the friction torque is greater than or equal to the threshold value, the apparatus may determine that a sensing delay has occurred in the sensor.

Figure 5:
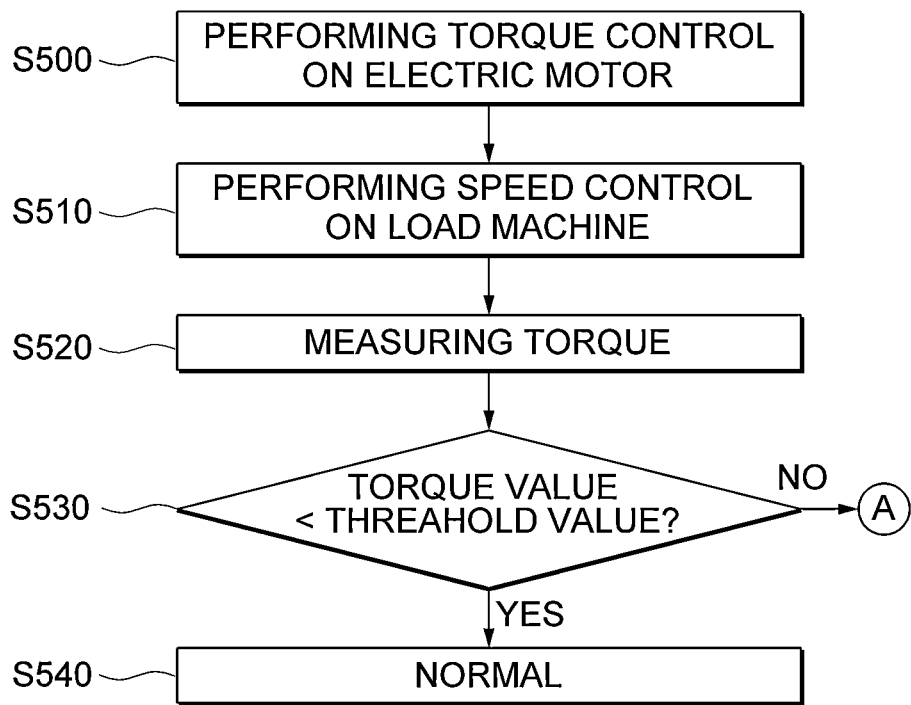
FIG. 5 is a diagram illustrating a process of determining whether a sensing delay has occurred during a torque control of an electric motor according to an embodiment of the present disclosure.
Figure 6:
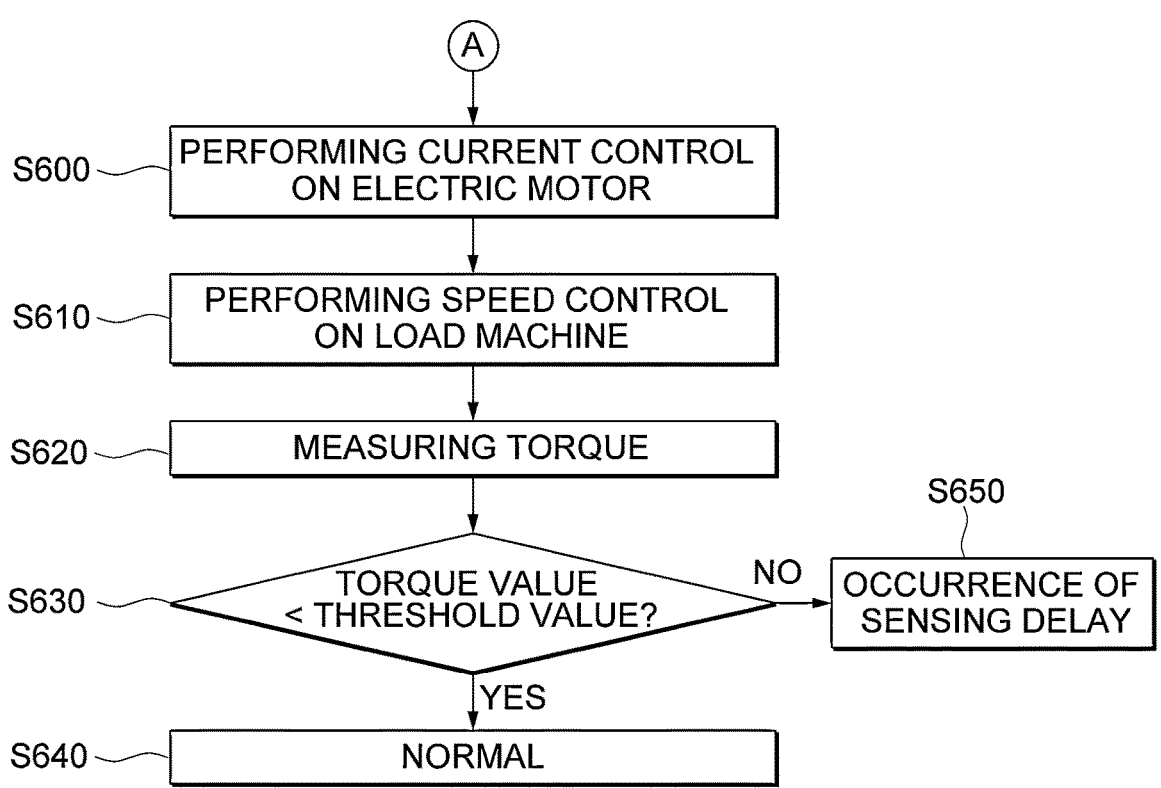
FIG. 6 is a diagram illustrating a process of determining whether a sensing delay has occurred when controlling a current for an electric motor according to an embodiment of the present disclosure.

FIG. 5 is a diagram illustrating a process of determining whether a sensing delay has occurred when controlling a torque of an electric motor according to an embodiment of the present disclosure, and FIG. 6 is a diagram illustrating whether a sensing delay has occurred when controlling a current of a motor according to an embodiment of the present disclosure.

Hereinafter, a process of detecting whether a sensing delay has occurred by a sensor included in an electric motor in an apparatus for detecting a sensing delay according to an embodiment of the present disclosure will be described in more detail with reference to FIGS. 5 and 6.

The apparatus for detecting a sensing delay may first check whether an abnormal torque is generated in an electric motor when controlling a 0 Nm torque of the electric motor. Specifically, referring to FIG. 5, a drive controller of the electric motor may perform a 0 Nm torque control on the electric motor in operation S500. Alternatively, the apparatus may control the drive controller to perform a torque control on the electric motor. Here, the 0 Nm torque control may mean that the electric motor is controlled to generate a 0 Nm torque.

Meanwhile, the apparatus may control the rotational speed of the load machine coupled with the electric motor in a state where the 0 Nm torque control is performed on the electric motor in operation S510. For example, the apparatus may control the rotational speed of the load machine to increase linearly from 0 rpm to the maximum speed. In this case, the apparatus may measure a torque generated by the electric motor and/or the load machine using a torque sensor provided in the load machine in operation S520, and compare the torque value obtained using the torque sensor to a threshold value in operation S530.

When the torque value is less than the threshold value, the apparatus may determine that the sensor provided in the electric motor is in a normal state in operation S540. However, when the torque value is greater than or equal to the threshold value, the apparatus may stop rotation of the load machine and perform an inspection A to determine whether an abnormal torque occurs even in a state where a maximum current control is applied to the electric motor.

Referring to FIG. 6, when a measured torque value is greater than or equal to a threshold value in a state where 0 Nm torque control is performed on the electric motor and a speed control is performed on the load machine, the apparatus may performs a maximum current control on the electric motor in operation S600, and while the maximum current control is performed on the electric motor, the apparatus may control a rotational speed of the load machine coupled with the electric motor to linearly increase from 0 rpm to a maximum speed in operation S610. In this case, the maximum current control may mean controlling the d-axis current so that the maximum torque is generated in the electric motor.

While the maximum current control is performed on the electric motor and the speed control is performed on the load machine, the apparatus may measure a torque generated in the electric motor and/or the load machine using a torque sensor provided in the load machine in operation S620, and compare a torque value obtained using the torque sensor and a threshold value to re-determine whether the torque value is greater than or equal to the threshold value in operation S630. If the torque value is less than the threshold value, the apparatus may determine that the corresponding sensor is in a normal state in operation S640. However, when the torque value is greater than or equal to the threshold value, the apparatus may determine that a sensing delay has occurred in the corresponding sensor in operation S650.

That is, when a torque value measured during 0 Nm torque control and a torque value measured during Id maximum current control are both greater than or equal to the threshold value, the apparatus may determine that a sensing delay has occurred by the corresponding sensor.

Meanwhile, the respective operations included in the method for detecting a sensing delay, performed by the apparatus according to the above-described embodiment, may be implemented as a computer program including instructions for causing a processor to perform the operations.

In addition, each operation included in the method for detecting a sensing delay, performed by the apparatus according to the above-described embodiment, may be implemented in a computer readable recording medium having a computer program storing instructions thereon, the instructions for causing a processor to perform the operations.

Combinations of individual steps of the appended flow diagrams of the present disclosure may be performed by computer program instructions. Since these computer program instructions may be provided to a processor of a general-purpose computer, a special-purpose computer, or other programmable data processing apparatus, the instructions executed through the processor of the computer or other programmable data processing apparatus generate means for implementing the functions specified in the individual steps of the flow diagrams. Since these computer program instructions may also be stored in a computer-usable or computer-readable memory that may be directed to a computer or other programmable data processing apparatus to implement a function in a particular manner, the instructions stored in the computer-usable or computer-readable memory may produce a manufacturing item including instructions that execute the functions specified in the individual steps of the flow diagrams. Since the computer program instructions may also be loaded onto a computer or other programmable data processing apparatus, by performing a series of operational steps on the computer or other programmable data processing apparatus to generate a process executed by the computer, the instructions operating the computer or other programmable data processing apparatus may also provide steps for executing the functions specified in the respective steps of the flow diagrams.

Also, each step may represent part of a module, segment, or code including one or more executable instructions for executing a specific logical function(s). Also, it is also possible that in some alternative embodiments, the specified functions are executed out of specified order. For example, it is possible that two steps shown one after another may be performed simultaneously, or the steps may be performed in reverse order depending on the corresponding functions.

The above description is merely exemplary description of the technical scope of the present disclosure, and it should be understood by those skilled in the art that various changes and modifications may be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims, and it should be appreciated that all technical scopes included within a range equivalent thereto are included in the protection scope of the present disclosure.

DETAILED DESCRIPTION OF MAIN
ELEMENTS

110: drive controller
120: inverter
130: electric motor
140: angle sensor
210: shaft
220: load machine
230: load controller
240: torque sensor
250: detector

What is claimed is:

1. An apparatus for detecting a sensing delay of a sensor provided in an electric motor, the apparatus comprising:
a shaft configured to be axially coupled with the electric motor;
a load machine axially coupled with the shaft;
a controller configured to control a rotational speed of the load machine;
a torque sensor connected to the load machine and configured to measure a torque; and
a detector configured to detect a sensing delay of the sensor based on a torque value which is difference between a measurement value measured by the torque sensor and a friction torque.

2. The apparatus of claim 1, further comprising:
a coupler provided in the shaft and coupling the electric motor and the load machine with each other.

3. The apparatus of claim 1, wherein the detector determines whether the torque value is greater than or equal to a threshold value based on that 0 Nm torque control is performed on the electric motor and a rotational speed control is performed on the load machine.

4. The apparatus of claim 1, wherein the controller is further configured to control the load machine so that the rotational speed increases linearly from 0 rpm to a maximum speed.

5. The apparatus of claim 3, wherein the controller is further configured to control stopping of rotation of the load machine based on that the torque value is greater than or equal to the threshold value.

6. The apparatus of claim 3, wherein the detector is further configured to re-determine whether the torque value is greater than or equal to the threshold value in a state where a maximum current control is performed on the electric motor and a rotational speed control is performed on the load machine based on that the torque value is greater than or equal to the threshold value.

7. The apparatus of claim 6, wherein the detector, according to a result of the re-determination, determines that a sensing delay has occurred in the sensor based on that the torque value is greater than or equal to the threshold value.

8. A method for detecting a sensing delay of a sensor provided in an electric motor by an apparatus for detecting a sensing delay, the method comprising:

controlling a rotational speed of a load machine coupled with the electric motor based on that a drive control is performed on the electric motor;
measuring a torque using a torque sensor provided in the load machine; and
detecting a sensing delay of the sensor based on difference between a measurement value received from the torque sensor and a friction torque.

9. The method of claim 8, wherein the controlling comprises controlling a rotational speed of the load machine to increase linearly from 0 rpm to a maximum speed based on that 0 Nm torque control is performed for the electric motor.

10. The method of claim 9, wherein the detecting comprises:
calculating the difference between the measurement value received from the torque sensor and the friction torque; and
comparing the difference between the measurement value and the frictional torque to a threshold value.

11. The method of claim 10, further comprising:
after the comparing, stopping the rotation of the load machine based on that the difference is greater than or equal to the threshold value.

12. The method of claim 11, further comprising:
after the stopping, re-determining whether the difference between the measurement value and the friction torque is greater than or equal to the threshold value based on that a maximum current control is performed on the electric motor and a rotational speed control is performed on the load machine.

13. The method of claim 12, further comprising:
after the re-determining, determining that a sensing delay has occurred in the sensor based on that the difference is greater than or equal to the threshold value.

14. A non-transitory computer program stored on a computer-readable recording medium, wherein the computer program comprises instructions that, when executed by a processor, perform operations comprising:
controlling a rotational speed of a load machine coupled with an electric motor based on that a drive control is performed on the electric motor;
receiving a measurement value from a torque sensor provided in the load machine; and
detecting a sensing delay of a sensor provided in the electric motor based on difference between the measurement value received from the torque sensor and a friction torque.

15. The method of claim 14, wherein the controlling comprises controlling the rotational speed of the load machine to increase linearly from 0 rpm to a maximum speed based on that 0 Nm torque control is performed on the electric motor.

16. The method of claim 15, wherein the detecting comprises:
calculating the difference between the measurement value received from the torque sensor and the friction torque; and
comparing the difference between the measurement value and the frictional torque to a threshold value.

17. The method of claim 16, further comprising:
after the comparing, controlling stopping of rotation of the load machine based on that the difference is greater than or equal to the threshold value.

18. The method of claim 17, further comprising:
after the controlling of the stopping, re-determining whether the difference between the measurement value and the friction torque is greater than or equal to the threshold value, based on that a maximum current control is performed on the electric motor and a rotational speed control is performed on the load machine.

19. The method of claim 18, further comprising:

after the re-determining, determining that a sensing delay has occurred in the sensor based on that the difference is greater than or equal to the threshold value.

\* \* \* \* \*